2,733,865

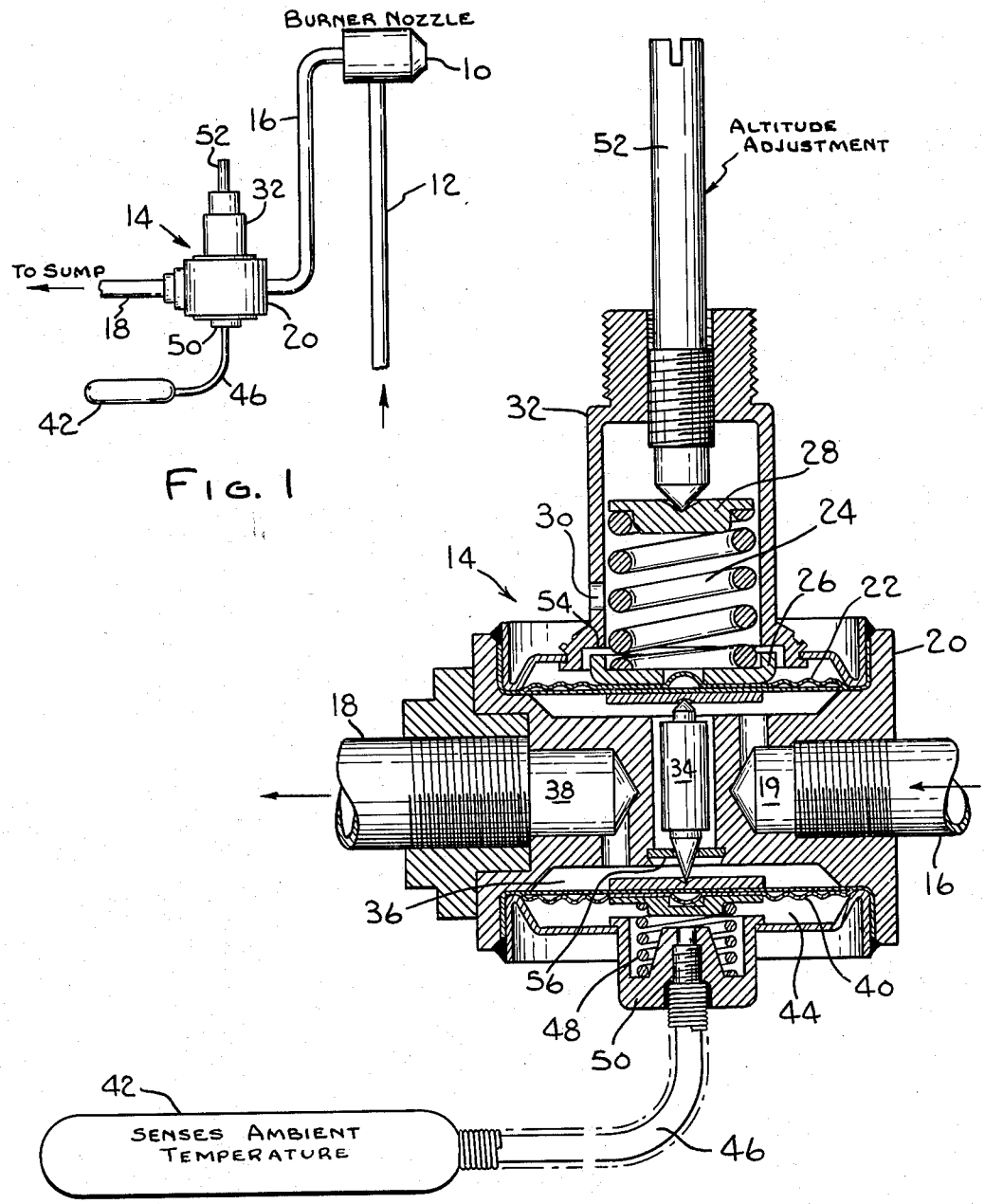

TEMPERATURE COMPENSATED BY-PASS VALVE

Edward C. Ehlke, Milwaukee, Wis., assignor to A P Controls Corporation, Milwaukee, Wis., a corporation of Wisconsin Application February 18, 1952, Serial No. 272,179

5 Claims. (Cl. 236—92)

This invention relates to a by-pass valve particularly adapted for use in conjunction with a burner for maintaining a desired air-fuel ratio. This valve may be placed in the by-pass line to automatically vary the amount of fuel passed to maintain a constant gage pressure at the burner nozzle (assuming the air density as affected by temperature to remain constant), and to compensate the gage pressure at the nozzle for air density variations occasioned by temperature changes.

This valve is designed for use in conjunction with heaters of the type now extensively used for providing temporary heat to buildings, etc. and for supplying heat to military equipment in cold climates to maintain the equipment in readiness for instant use or to warm up equipment in order to permit its use. The maintenance of a desired air fuel ratio is, of course, important to proper operation of a burner. This valve compensates the fuel pressure at the nozzle for changes in the air density caused by temperature changes. A further function of this valve is to maintain, assuming the ambient temperature to be constant, a desired gage pressure to insure the proper air fuel ratio. This latter function, therefore, compensates for variations in the delivery pressure of the fuel pump.

An object of this invention is to provide a simple, low-cost valve for compensating fuel flow for air density variations occasioned by temperature changes.

Another object is to provide a fuel by-pass valve which will maintain a constant pressure at its inlet.

Another object is to provide a fuel by-pass valve which will automatically maintain a desired air fuel ratio at a burner over a wide range of temperature and air density changes.

Other objects and advantages will be pointed out in, or be apparent from, the specification and claims, as will obvious modifications of the single embodiment shown in the drawings, in which:

Fig. 1 is a schematic lay-out of the valve in the burner system; and

Fig. 2 is a vertical section through the valve.

The burners of the type briefly described above are provided with a nozzle 10 to which fuel (gasoline) is supplied through conduit 12 from a pump, not shown. A heater fan supplies the combustion air to the burner. The present valve 14 is placed in by-pass conduit 16 to pass surplus fuel to the sump through conduit 18 to maintain the desired air fuel ratio at the burner nozzle in spite of variations in the pump delivery pressure and in spite of air density changes occasioned by ambient temperature variations.

The by-pass conduit 16 is connected to inlet 19 in the valve casing 20. The valve inlet pressure acts on the underside of pressure regulating diaphragm 22 to urge the diaphragm upwardly in opposition to the force of spring 24 compressed between diaphragm pad 26 and plate 28 and in opposition to atmospheric pressure acting on the top of diaphragm 22 through port 30 in the diaphragm cap 32. When the inlet pressure exceeds the force of atmospheric pressure and spring 24, diaphragm 22 is overbalanced and moves upwardly to allow valve 34 to open and fuel to flow into chamber 36 which communicates with outlet 38. Diaphragm 22, therefore, maintains the valve inlet pressure constant which results in a constant fuel pressure at the burner nozzle 10. Since the nozzle pressure is constant the flow rate and air fuel rate are constant.

The bottom or air density diaphragm 40 in valve 14 is acted upon by pressure variations in charged bulb 42 connected to chamber 44 by means of capillary tube 46. Bulb 42 may be placed in the air intake to vary the pressure in chamber 44 in accordance with ambient temperature. A light spring 48 is compressed between diaphragm cap 50 and diaphragm 40 to urge the diaphragm upwardly. It is this spring which actually opens valve 34 when the pressure diaphragm 22 is overbalanced since both diaphragms merely abut the valve. Assuming now that valve 34 is closed or is partly open in order to maintain the desired gage pressure at the burner, if the ambient temperature increases and thus indicates air of less density the pressure in chamber 44 will increase to open valve 34 or to move it further open depending upon the initial condition of the valve. This will act to pass more fuel and decrease the amount of fuel available at the burner, thus maintaining the proper air-fuel ratio.

It will be appreciated that in order to eliminate variables in the operation of the valve it is highly desirable to maintain the outlet pressure of valve 14 as close as possible to zero gage.

It will be apparent that the degree of compression of spring 24 will determine the gage pressure at the burner nozzle. The proper compression of spring 24 to obtain the desired air-fuel ratio at sea level obviously would not give the desired air fuel ratio at an altitude of 10,000 feet. For the purpose of adjusting the valve to the operating altitude, pin 52 is threadably connected to diaphragm cap 32 to permit the degree of compression of spring 24 to be adjusted. As the altitude is increased the air becomes less dense and the amount of fuel burned should be decreased in order to maintain the desired air-fuel ratio. Therefore the valve should be set to pass more fuel. With this in mind it will be apparent that pin 52 is adjusted to decrease the compression of spring 24 until the desired air-fuel ratio is obtained. After the pin has been set, the valve will function to compensate for temperature induced air density changes and to maintain the desired gage pressure at the burner as set forth above. Of course, if the altitude at which the heater is used is changed the apparatus must again be adjusted.

One further construction feature should be noted. Damage to the diaphragms is prevented by limiting the movement of the upper diaphragm in the upward direction. Thus the cupped edge of the diaphragm pad 26 contacts shoulder 54 to limit upward movement and prevent rupture of the diaphragms. Downward movement of the diaphragms is, of course, limited by contact of valve 34 with its seat 56.

Although but one embodiment of the present invention has been illustrated and described, it will be apparent to those skilled in the art that various changes and modifications may be made therein without departing from the spirit of the invention or from the scope of the appended claims.

I claim:

1. A valve adapted for use in a fuel by-pass line to vary the gage pressure at a burner to maintain a desired air-fuel ratio as the air-density varies with ambient temperature, comprising, a casing having an inlet and an outlet with a valve seat therebetween, a valve adapted to cooperate with said seat to regulate flow between the inlet and the outlet, a pressure regulating diaphragm mounted in the casing with one side exposed to inlet pressure and its other side exposed to atmospheric pressure, the effective area of said diaphragm exposed to inlet pressure being appreciably greater than the area of said valve seat thereby to render said diaphragm responsive to inlet gauge pressure, a spring exerting a preselected force on said other side of said diaphragm in the valve closing direction, an air density regulating diaphragm mounted in said casing with one side exposed to outlet pressure and the other side exposed to pressure in a chamber, temperature responsive means connected to said chamber and operative to vary the chamber pressure in accordance with ambient temperature, both of said diaphragms being operatively connected to said valve so that said spring opposes movement of said air density diaphragm in the valve opening direction.

2. A valve adapted for use in a fuel by-pass line to vary the gage pressure at a burner to maintain a desired air-fuel ratio as the air-density varies with ambient temperature, comprising, a casing having an inlet and an outlet with a valve seat therebetween, a diaphragm on either side of said seat with one diaphragm exposed to inlet pressure and the other exposed to outlet pressure, a valve operatively connected to said diaphragms and adapted to cooperate with said seat to control flow through the casing, atmospheric pressure and a spring acting on said one diaphragm in opposition to said inlet pressure to urge the valve in the closing direction, the effective area of said one diaphragm exposed to inlet pressure being appreciably greater than the effective area of said valve seat thereby to render said one diaphragm responsive to inlet gauge pressure, a chamber on the side of said other diaphragm opposite to the side upon which the outlet pressure acts, a charged feeler bulb adapted to respond to ambient temperature and connected to the chamber by means of a capillary tube to increase the pressure in the chamber as the ambient temperature increases to urge the valve in the opening direction.

3. A valve according to claim 2 in which the outlet of the valve is of such size as to maintain the outlet pressure approximately at zero gage.

4. A valve according to claim 2 including means for adjusting the force exerted by said spring.

5. A valve adapted for use in a fuel by-pass line to vary the gage pressure at a burner to maintain a desired air-fuel ratio as the air-density varies with ambient temperature, comprising, a casing having an inlet and an outlet with a valve seat therebetween, a valve adapted to cooperate with said seat to regulate flow between the inlet and the outlet, first and second means operatively connected to said valve and respectively responsive to inlet gage pressure and ambient temperature to urge the valve in the opening direction with an increase in either response condition, said first means including a diaphragm having opposite sides thereof exposed to atmospheric pressure and to inlet pressure respectively, the side thereof which is exposed to inlet pressure having an effective area which is appreciably greater than the effective area of said valve seat to thereby maintain inlet pressure at a selected level modified to compensate the selected level for temperature-induced air density changes whereby a constant air-fuel ratio may be maintained at a burner upstream of said inlet.

References Cited in the file of this patent

UNITED STATES PATENTS

| | | |
|---|---|---|
| 1,850,371 | Beebe | Mar. 22, 1932 |
| 1,969,652 | Larkin | Aug. 7, 1934 |
| 2,122,931 | Dube | July 5, 1938 |
| 2,192,117 | Wile | Feb. 27, 1940 |
| 2,636,357 | Woods | Apr. 28, 1953 |